Figure 1:
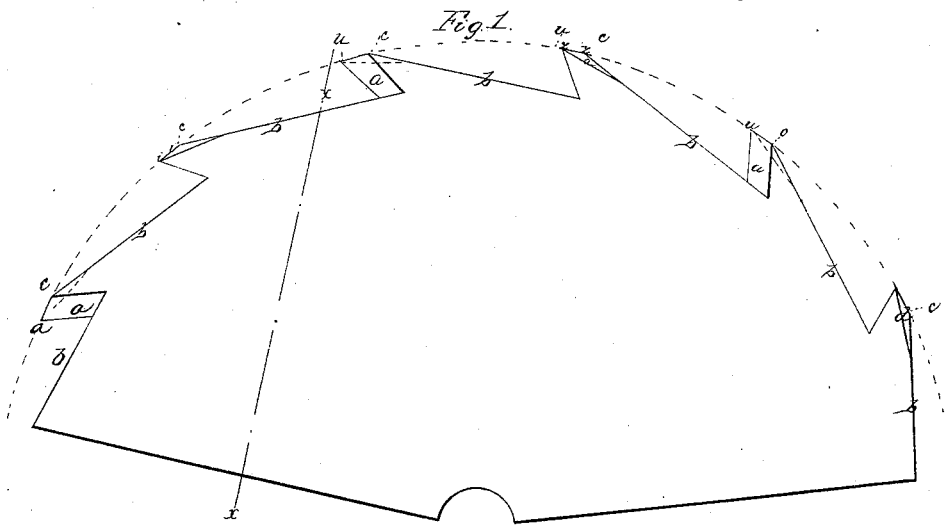

I. Mason,
Saw.

Nº 29,982.    Patented Sep. 11, 1860.

Witnesses.
D. C. Bean
Fletcher I. Bean

Inventor.
Ira. Mason

UNITED STATES PATENT OFFICE.

IRA MASON, OF BERLIN, NEW HAMPSHIRE.

SAW-TOOTH.

Specification of Letters Patent No. 29,982, dated September 11, 1860.

*To all whom it may concern:*

Be it known that I, IRA MASON, of Berlin, in Coos county, in the State of New Hampshire, have invented certain new and useful Improvements in the Formation and Set of Saw-Teeth; and I do hereby declare that the following, taken in connection with the drawings which accompany and form part of this specification, is a description of my invention so full and exact as to enable those skilled in the art to practice it.

In the practice of my invention, the teeth are so shaped that when their faces ($a$) are filed obliquely to the sides of the saw, their cutting edges $z, z$, (formed by the juncture of the planes making the faces ($a$) and the tops ($d$) of the teeth) are oblique to the sides of the saw, and in circular saws in a cylinder which is perpendicular to the sides thereof and in reciprocating saws in a plane which is at right angles to their sides. By such a formation the whole length of each of the edges referred to, which length is the thickness of the saw, becomes a cutting edge operating with what may be termed a drawing or shearing cut; that is, each portion of each edge is always operating in advance of, or following, other portions of the same edge, though they are all cutting in the same plane. By the drawing nature of the cut, the saw operates with a less expenditure of power, than when the teeth are shaped by filing the faces and tops square across, so that in circular saws their cutting edges are parallel with their axes, or in other saws square to their sides.

The cut made by the edges $z, z$, of my improved teeth, is at right angles with the sides of the "kerf" produced by the saw, which is of importance in forming grooves mortises tenons &c. which are finished by the saw alone. The cut by other saws has been, in some instances, square to the "kerf" formed by them, but these had their teeth filed square across, and did not have the drawing cut which distinguishes my invention, which is characterized by the oblique edge giving a drawing cut, and at the same time making the terminus of the "kerf" square with its sides.

Figure 2:
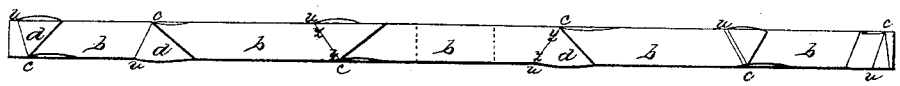
Figure 3:
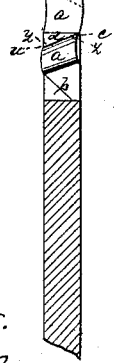
Figure 4:
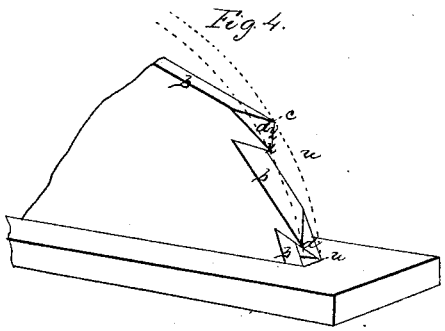

In the drawings, which better describe the form of the teeth that can be done in words, Figure 1 is a side view of a portion of a circular saw which embodies my invention. Fig. 2, is a plan of the same, or a bird's-eye view of it. Fig. 3, is a section through the saw, taken on the line $x, x$, seen in Fig. 1, and showing the teeth beyond, looking toward their faces. Fig. 4, is a perspective view of a portion of the saw, shown as in action, and illustrating the operation of the cutting edges of the teeth. In the drawings the saw is shown disproportionately thick, in order to bettter illustrate the form of the teeth.

The faces $a$ of the teeth are filed obliquely and alternating, and I prefer that they should not be made so as to depart from a perpendicular to their sides more than at an angle of from 30° to 45°. The hook of the faces, or, the amount of their variation from radial lines, may be varied from that shown in the drawings, according to the purpose to which the saw is to be applied, a greater amount of hook being admissible for soft wood, than for hard. The tops ($b$) of the teeth are filed at right angles to the sides of the saw from the bottom of the face of the following tooth toward its own point, and till the surfaces thus formed, meet the inner corners ($c$) of the teeth. Then the saw should be driven in its intended plane of action against some hard substance, which will grind, or cut away, the ends of the teeth, when from the line formed at the angle of the faces ($a$) with the ground surfaces, the tooth is to be filed back toward the face of the next tooth following, leaving the facets ($d$). Thus it will be seen that the cutting edge of the tooth which is the line $z, z$, will be throughout its length in the plane of the terminal cut of the saw, which will be at right angles to the sides of the saw and the "kerf" formed by it. Of the facet ($d$), it may be said that its form and angle is not of importance, provided its surface is kept below the path of the ends or points of the teeth. I prefer not to extend it farther toward the face of the following tooth, than is shown in the drawing, because to do so would unnecessarily weaken the tooth.

In practice, in grinding the points of the teeth of circular saws, I hold against them, when running, a bar of round iron placed on the saw bench, parallel with the saw arbor. To set the saw so that it will cut slightly wider than the thickness of the saw plate for the usual purpose and to relieve the outer points ($u$) of the wear which comes upon them in all other varieties of set with which I am acquainted, they being therein the salient points, I proceed as follows: With a grip or jaw set put well down on each tooth, I bend them alternately to each side, and then with such a set, placed higher up on the tooth, I bend back the point to its normal position. This leaves the teeth projecting alternately on each side, as shown in Fig. 2, but below their points. I bring the edges thus left projecting beyond the sides of the saw plate into line by holding against them when the saw is running a hard whetstone which also takes off the roughness left by the file, and as the points of the teeth may have been slightly deranged by the setting operation, I lightly touch the points of the teeth, to grind them as before described, and again finish them, to an edge.

It will be obvious that in a saw filed and set substantially as described, whether circular or reciprocating, I have a greater amount of cutting edge, than in other saws which are so set that the points of the teeth have not only to cut the advance, but also the clearance, and that consequently the saw will remain longer in order, and do better average work, than other saws. The sides of the teeth which are set outward act to plane the sides of the "kerf" like the knives of the "Bramah wheel," opening the "kerf" and relieving the outer points ($u$) of that duty.

While I have in describing my invention confined my illustration almost wholly to circular saws, it will be evident that my improvement is equally applicable to other kinds of saws. For many rotating cutters for forming grooves mortises, and tenons, where the bottom of the cut is required to be square with the sides, my invention is applicable, or so much of it as does not relate to the set of the teeth which generally in such cutters are too thick to be set by bending.

I claim—

1. Shaping saw teeth substantially as described, so that the edges $z\ z$ operate with a drawing cut and leave the boundary of the kerf square with the sides thereof.

2. The peculiar set given to the teeth herein shown and described.

3. Giving to the teeth of a saw, in combination the form and set as above claimed.

IRA MASON.

Witnesses:
FLETCHER I. BEAN,
D. C. BEAN.